(12) United States Patent
Vachon

(10) Patent No.: US 12,091,824 B2
(45) Date of Patent: *Sep. 17, 2024

(54) PADDING LAYER FOR ATHLETIC FIELD

(71) Applicant: SAFEPLAY LLC, Cedar Park, TX (US)

(72) Inventor: Frédéric Vachon, Ville d'Anjou Montreal (CA)

(73) Assignee: SAFEPLAY LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,950

(22) Filed: Nov. 14, 2022

(65) Prior Publication Data

US 2023/0075317 A1    Mar. 9, 2023

Related U.S. Application Data

(63) Continuation of application No. 17/084,714, filed on Oct. 30, 2020, now Pat. No. 11,499,275, which is a continuation of application No. 16/565,688, filed on Sep. 10, 2019, now Pat. No. 10,995,458, which is a (Continued)

(51) Int. Cl.
| | |
|---|---|
| *E01C 13/04* | (2006.01) |
| *A63B 71/00* | (2006.01) |
| *A63C 19/02* | (2006.01) |
| *A63C 19/04* | (2006.01) |
| *E01C 3/00* | (2006.01) |
| *E01C 11/22* | (2006.01) |

(Continued)

(52) U.S. Cl.
CPC .......... *E01C 13/02* (2013.01); *A63B 71/0054* (2013.01); *A63C 19/02* (2013.01); *A63C 19/04* (2013.01); *E01C 3/006* (2013.01); *E01C 11/225* (2013.01); *A63B 2071/0063* (2013.01); *B32B 3/00* (2013.01); *E01C 13/04* (2013.01); *E01C 2201/14* (2013.01); *E01C 2201/205* (2013.01); *Y10T 428/192* (2015.01); *Y10T 428/24273* (2015.01); *Y10T 428/24479* (2015.01)

(58) Field of Classification Search
None
See application file for complete search history.

(56) References Cited

U.S. PATENT DOCUMENTS

| | | | |
|---|---|---|---|
| 3,231,454 | A | 1/1966 | Williams |
| 5,383,314 | A | 1/1995 | Rothberg |
| 7,645,501 | B2 | 1/2010 | Sawyer et al. |

(Continued)

FOREIGN PATENT DOCUMENTS

| | | |
|---|---|---|
| CA | 2857618 A1 | 1/2015 |
| CA | 2803643 C | 5/2018 |

*Primary Examiner* — Alexander S Thomas
(74) *Attorney, Agent, or Firm* — Perilla Knox & Hildebrandt LLP; Kenneth A. Knox; Stephanie L. Davy-Jow

(57) ABSTRACT

Various embodiments for a pad that may be combined with other similar pads to form a padding layer of an athletic field, or other surface, are disclosed. The pad includes a top surface and a bottom surface. Bottom-side projections are positioned on the bottom surface of the pad. Water channels are positioned on the bottom surface of the pad defined as a recessed area between individual ones of the bottom-side projections. A drainage hole is positioned in at least one of the bottom-side projections such that the drainage hole does not connect with any of the water channels on the bottom surface.

19 Claims, 11 Drawing Sheets

Related U.S. Application Data continuation of application No. 15/901,612, filed on Feb. 21, 2018, now Pat. No. 10,415,193.

(60) Provisional application No. 62/461,360, filed on Feb. 21, 2017.

(51) Int. Cl.
*E01C 13/02* (2006.01)
*B32B 3/00* (2006.01)

(56) References Cited

U.S. PATENT DOCUMENTS

| | | |
|---|---|---|
| 7,662,468 B2 | 2/2010 | Bainbridge |
| 7,785,692 B1 | 8/2010 | Siegel |
| D637,318 S | 5/2011 | Sawyer et al. |
| D645,169 S | 9/2011 | Runkles |
| 8,236,392 B2 | 8/2012 | Sawyer et al. |
| 8,353,640 B2 | 1/2013 | Sawyer |
| 8,356,447 B2 | 1/2013 | Lach |
| 8,568,840 B2 | 10/2013 | Sawyer et al. |
| 8,597,754 B2 | 12/2013 | Sawyer et al. |
| 8,603,601 B2 | 12/2013 | Sawyer et al. |
| 8,662,787 B2 | 3/2014 | Sawyer et al. |
| 8,668,403 B2 | 3/2014 | Sawyer |
| 8,858,349 B2 | 10/2014 | Vachon |
| 8,967,906 B2 | 3/2015 | Sawyer |
| 9,394,651 B2 | 7/2016 | Sawyer |
| 9,771,692 B2 | 9/2017 | Sawyer et al. |
| 9,790,646 B2 | 10/2017 | Sawyer et al. |
| D866,800 S | 11/2019 | Runkles et al. |
| D874,682 S | 2/2020 | Vachon |
| D886,333 S | 6/2020 | Vachon |
| 10,982,395 B2 | 4/2021 | Sawyer et al. |
| 2011/0173901 A1 | 7/2011 | Runkles et al. |
| 2013/0102403 A1 | 4/2013 | Vachon |
| 2015/0176225 A1 | 6/2015 | Sawyer |
| 2016/0265170 A1 | 9/2016 | Vachon et al. |
| 2017/0101789 A1 | 4/2017 | Cormier et al. |
| 2019/0203425 A1 | 7/2019 | Sawyer et al. |
| 2019/0376241 A1 | 12/2019 | Vachon |
| 2020/0063379 A1 | 2/2020 | Sawyer et al. |
| 2020/0070038 A1 | 3/2020 | Vachon |
| 2020/0181854 A1 | 6/2020 | Vachon |
| 2020/0181855 A1 | 6/2020 | Vachon |

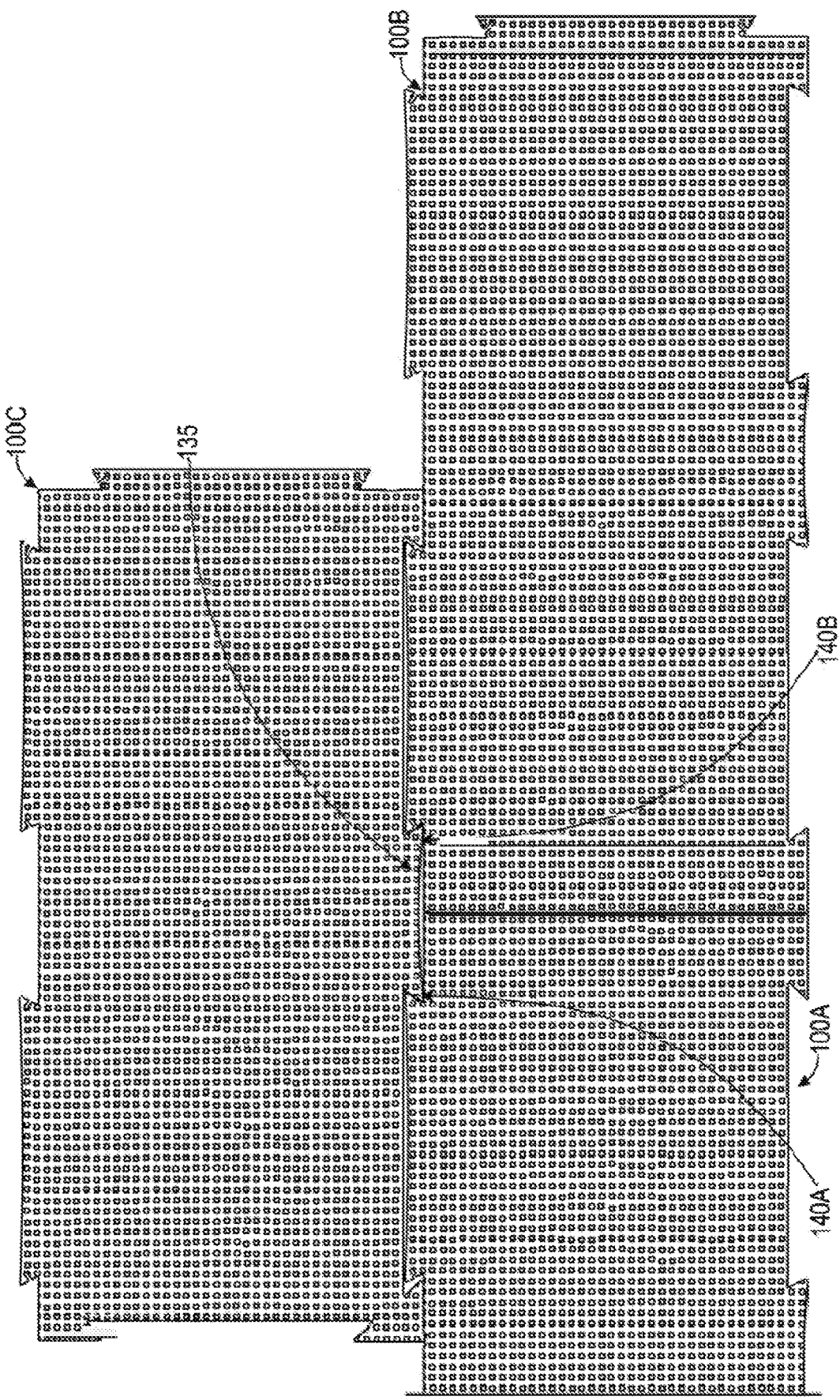

PADDING LAYER FOR ATHLETIC FIELD

CROSS-REFERENCE TO RELATED APPLICATIONS

This application is a continuation of U.S. patent application Ser. No. 17/084,714 entitled "PADDING LAYER FOR ATHLETIC FIELD," filed October 30, 2020, now issued as U.S. Pat. No. 11,499,275 which is a continuation of U.S. patent application Ser. No. 16/565,688 entitled "PADDING LAYER FOR ATHLETIC FIELD," filed Sep. 10, 2019, now issued as U.S. Pat. No. 10,995,458, which is a continuation of U.S. patent application Ser. No. 15/901,612 entitled "PADDING LAYER FOR ATHLETIC FIELD," filed Feb. 21, 2018, now issued as U.S. Pat. No. 10,415,193 B2, which claims the benefit of and priority to U.S. Provisional Patent Application No. 62/461,360 entitled "PADDING LAYER FOR ATHLETIC FIELD," filed Feb. 21, 2017, the contents of each of which being incorporated by reference in their entireties herein.

BACKGROUND

Shock pads and elastic layers for athletic fields are generally flat and follow the slope of any supporting infrastructure, such as stone base or porous asphalt. If the supporting infrastructure is flat, sloped, or otherwise irregular, water repartition problems can happen.

BRIEF SUMMARY

A pad for use in a padding layer of a panel system is described that may include a top side having a center configured to support a top layer, the top side having a surface that slopes downwards from the center of the top side to edges of the pad. The top side of the pad may include a plurality of top-side projections, individual ones of the plurality of top-side projections having a height varied from other ones of the top-side projections. In some embodiments, the height of the top-side projections may be determined as a function of a distance of a respective one of the plurality of top-side projections from an edge of the pad.

The pad may include a bottom side having a plurality of bottom-side projections and a drainage hole that fluidly couples at least one of the plurality of top-side projections with at least one of the plurality of bottom-side projections. The bottom-side projections may be trapezoidal-shaped or other shape and include a projection channel within a perimeter of the bottom-side projections such that the projection channel does not couple to a bottom pad channel beyond the perimeter of the bottom-side projections. A projection channel may be positioned wholly within the perimeter of the bottom-side projections, which also may be trapezoidal-shaped or circular-shaped, for example. The projection channel may include recesses that extend radially from a drainage hole positioned at a center of the bottom-side projections to a perimeter of the projection channel.

The surface of the top side of the pad may include at least one water trap in a sloped portion of the surface, the at least one water trap comprising a recess configured to trap water, where an evaporation of the water from the recess causes a cooling of the top layer. The bottom surface of the pad may be configured for installation over a base surface and under the top layer.

A height of the pad at the edges of the pad may be 0.25% to 1% less than a height of the pad at the center. The pad may further include a male locking element configured to couple to a female locking element of an abutting pad, the abutting pad being substantially similar to the pad. The pad is formed of a hydrophobic material, such as nanocellulose. The top layer may include an artificial field turf layer. A method may include the pad as described above.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 10 is an arrangement of multiple pads according to various embodiments of the present disclosure.

DETAILED DESCRIPTION

The present disclosure relates to a padding layer that can be implemented in a padding layer of an athletic field. As noted above, shock pads and elastic layers using in padding layers of athletic fields are generally flat and follow the slope of any supporting infrastructure, such as stone base or porous asphalt. If the supporting infrastructure is flat, sloped, or otherwise irregular, water repartition problems can occur.

According to various embodiments, a padding layer for a multi-layered sports playing field or other type of surface is described. Various improvements of a pad for use in forming a padding layer consisting of abutting pads (also referred to as "panels") may be realized through use of the padding layer, such as enhancing water drainage, heat management, ease of assembly and installation, durability, longevity, uniformity, and resistance to change in weather according to seasons, all while maintaining safety.

Figure 1:
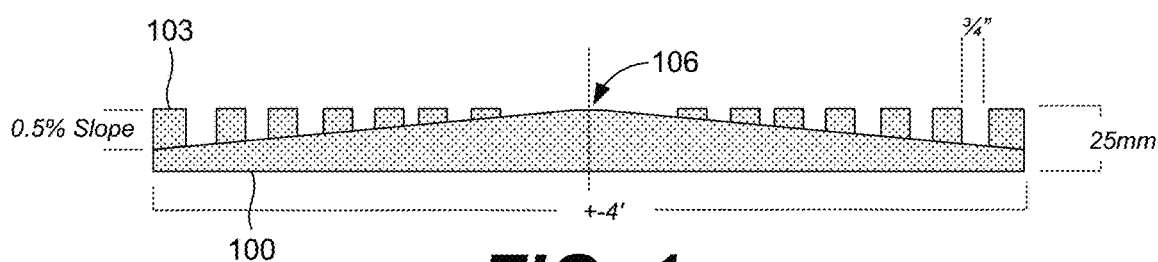
FIG. 1 is a front view of a pad for use in a padding layer of an athletic field according to various embodiments of the present disclosure.

Turning now to FIG. 1, a front view of an embodiment of a pad 100 is shown to resolve the problem of water repartitioning. The pad 100 may be employed or used in a padding layer of a field, such as those described in Canadian Patent Application No. 2803643A1 entitled "PADDING LAYER FOR MULTI-LAYERED SPORTS PLAYING FIELD, filed on Jun. 30, 2011, the contents of which are incorporated by reference in their entirety herein.

In various embodiments, the pad 100 may have an inclination (an angle of incline) from a center 106 of the pad 100 to edges of the pad 100 of approximately 0.25% to 1%, for instance, to facilitate water evacuation on edges of the pad 100. In other words, the pad 100 may have a height at the edges of the pad 100 being 0.25% to 1% less than a height of the panel at the center. In FIG. 1, a non-limiting example of an inclination of 0.5% is shown, meaning the pad 100 may have a height at the edges of the pad 100 being 0.5% less than a height of the panel at the center (e.g., 25 mm).

The pad 100 may include a top surface having a plurality of top-side projections 103 that couple to a surface layer (not shown), with can include an artificial turf field layer, or other similar layer. The top-side projections 103 gradually increase or decrease in height depending, for example, on their location on the pad 100. In other words, a respective one of the top-side projections 103 may be a function of its distance from an edge (or the center 106) of the pad 100.

By virtue of the varied heights of the top-side projections 103 on the sloping surface, the top-side projections 103 may have tops capable of forming a flat support for an artificial turf or other top surfaces. In some embodiments, the top-side projections 103 may include a predetermined space (e.g., ¾" or ⅜") between one another to optimize turf (or other top layer) stability. Inclination may be formed in one direction or in both directions to form a shape of a rectangular-based pyramid, as shown in FIG. 1. In some embodiments, the pad 100 may be formed of one or more of nanocellulose (e.g., nanocellulose beads), expanded polypropylene (EPP), hybrid expanded polypropylene EPP (HEPP), a mix of an expanded polypropylene (EPP) with an expanded polyethylene (EPE) or polyethylene (PE), and a rubber material. In some embodiments, a first side of the pad 100 is symmetrical to a second side of the pad 100, as shown in FIG. 1. Further, in some embodiments, the center 106 may have a flat surface (e.g., not having a slope).

Figure 2A:
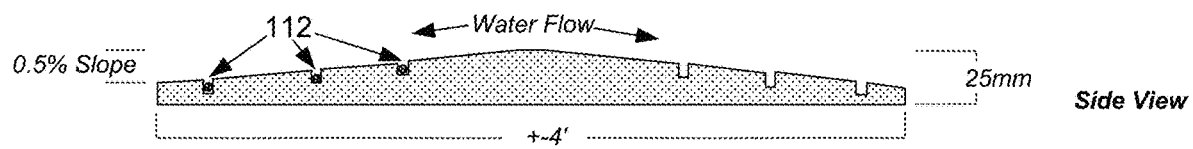
FIG. 2A is a side view of the pad for use in the padding layer of an athletic field according to various embodiments of the present disclosure.
Figure 2B:
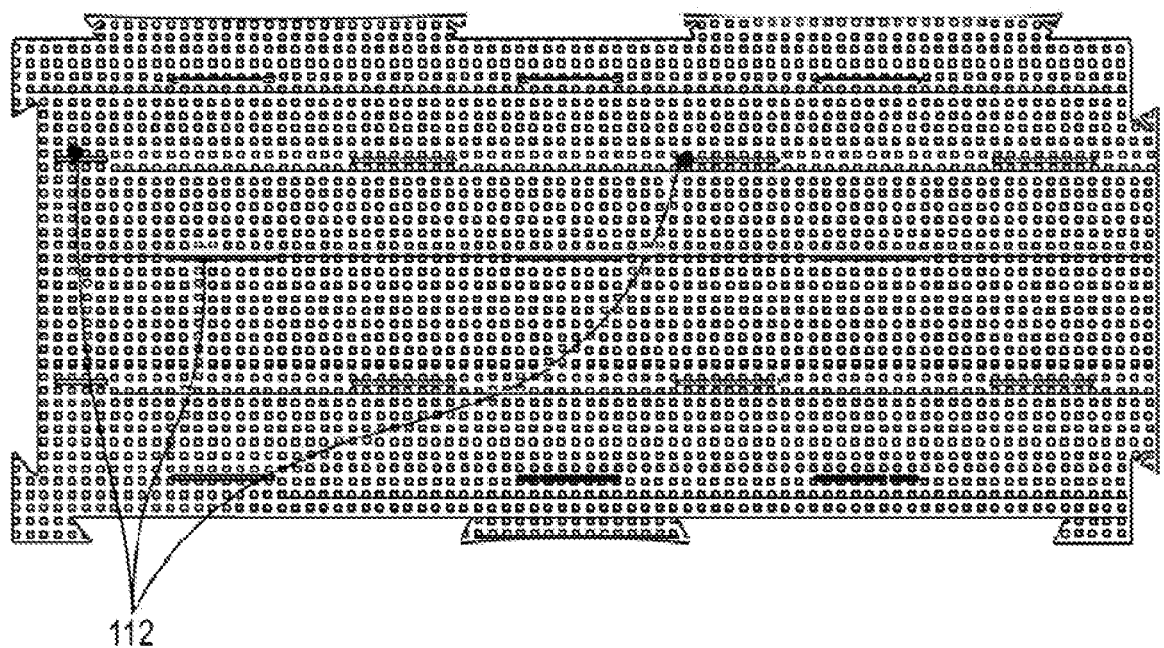
FIG. 2B is a top view of the pad for use in the padding layer of an athletic field according to various embodiments of the present disclosure.
Figure 3:
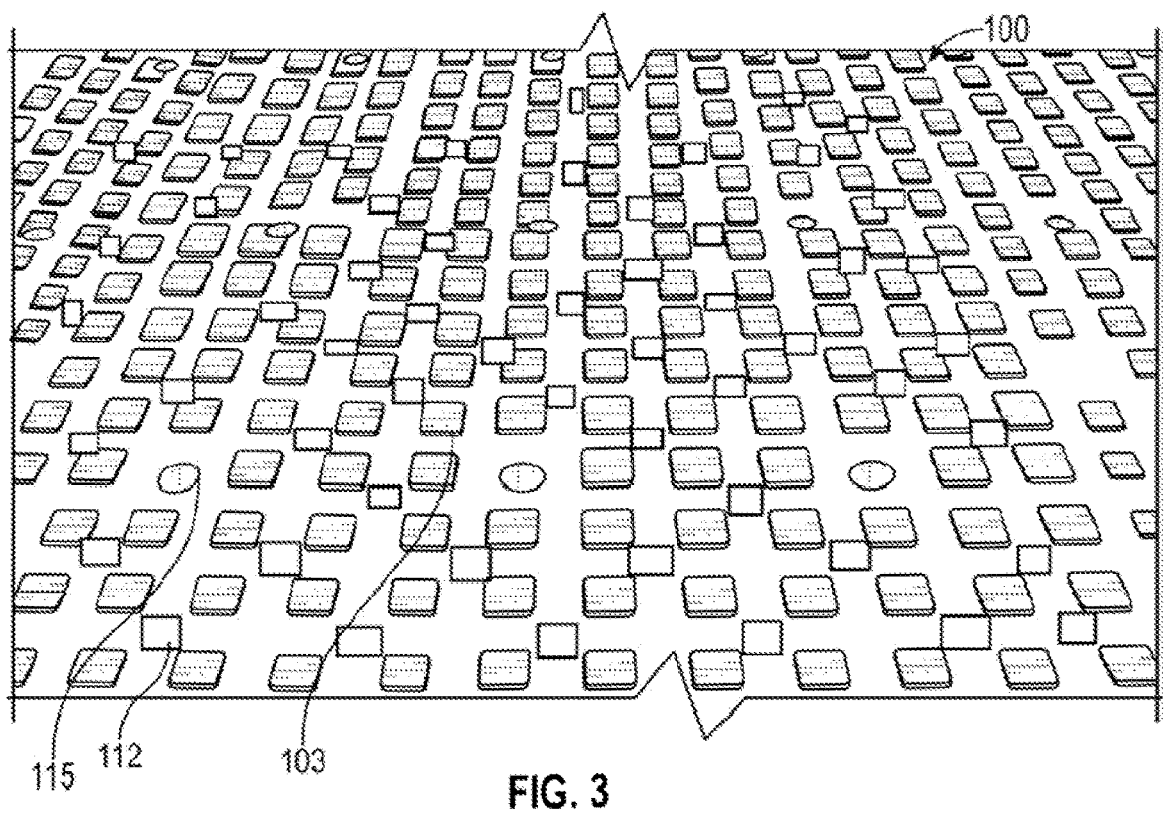
FIG. 3 is a top, perspective view of the pad for use in the padding layer of an athletic field according to various embodiments of the present disclosure.

As may be appreciated, it is beneficial to evacuate water as soon as possible as many types of materials that make up the pad 100 absorb moisture. For instance, some types of padding materials have properties that change when the material is damp or saturated. Because embodiments described herein may include a pad 100 formed of a closed-cell, hydrophobic material that doesn't absorb moisture (e.g., nanocellulose), in some embodiments, the pad 100 may include internal recesses, referred to herein as water traps 112. As shown in FIGS. 2A-2B, the water traps 112 may be positioned along sloped portions of the top surface of the pad 100, for instance, in a direction of water flow to capture as much water as possible in the water traps 112. Once the water traps 112 are full, the water traps may act as a water retention basin. In hot temperatures, moisture will be evacuated from the water traps and a field supported by the pad 100, as well as other components of the system, may cool down in temperature. The water traps 112 may be positioned as various locations of the pad 100. Further, in some embodiments, the water traps 112 may include slits, snake-shaped recesses, zig zagging recesses. Additionally, in some embodiments, the water traps 112 may be positioned in areas between or in place of top-side projections 103 in a row of top-side projections 103, as shown on the top surface of the pad 100 illustrated in FIG. 3. The water traps 112 are distinguishable from drainage holes 115 of the pad 115 as they do not completely drain water, but instead are merely recessed reservoirs to retain water in the water traps 112. The pad 100, however, can include a combination of drainage holes 115 and water traps 112, as may be appreciated.

Figure 4:
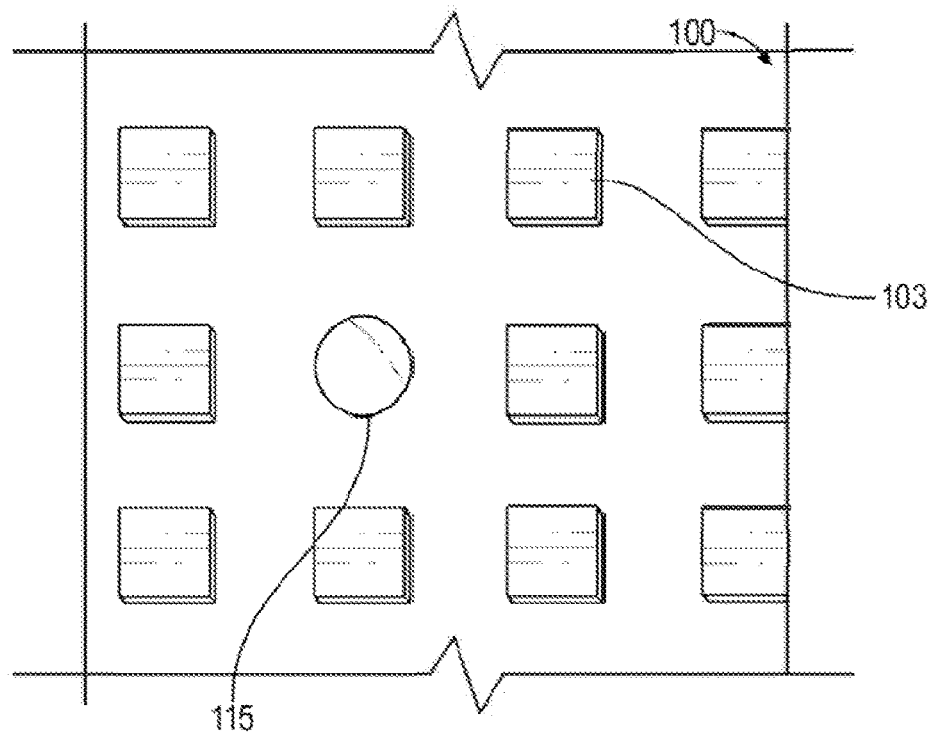
FIG. 4 is an enhanced top view of the pad for use in the padding layer of an athletic field according to various embodiments of the present disclosure.

Referring next to FIG. 4, to allow water circulation between a top surface of the pad 100 and a bottom surface of the pad 100, the drainage holes 115 may be positioned in place of a top-side projection 103, for instance, in a row of top-side projections 103, such that the drainage holes 115 do not interfere with any top drainage channels. In some embodiments, the drainage hole 115 may be substantially similar in size and/or shape of the top-side projection 103. For instance, the drainage hole 115 may not be larger than a top-side projection 103 (or a bottom-side projection 118) so that the drainage hole 115 does not interfere with flow of water in channels.

Figure 5:
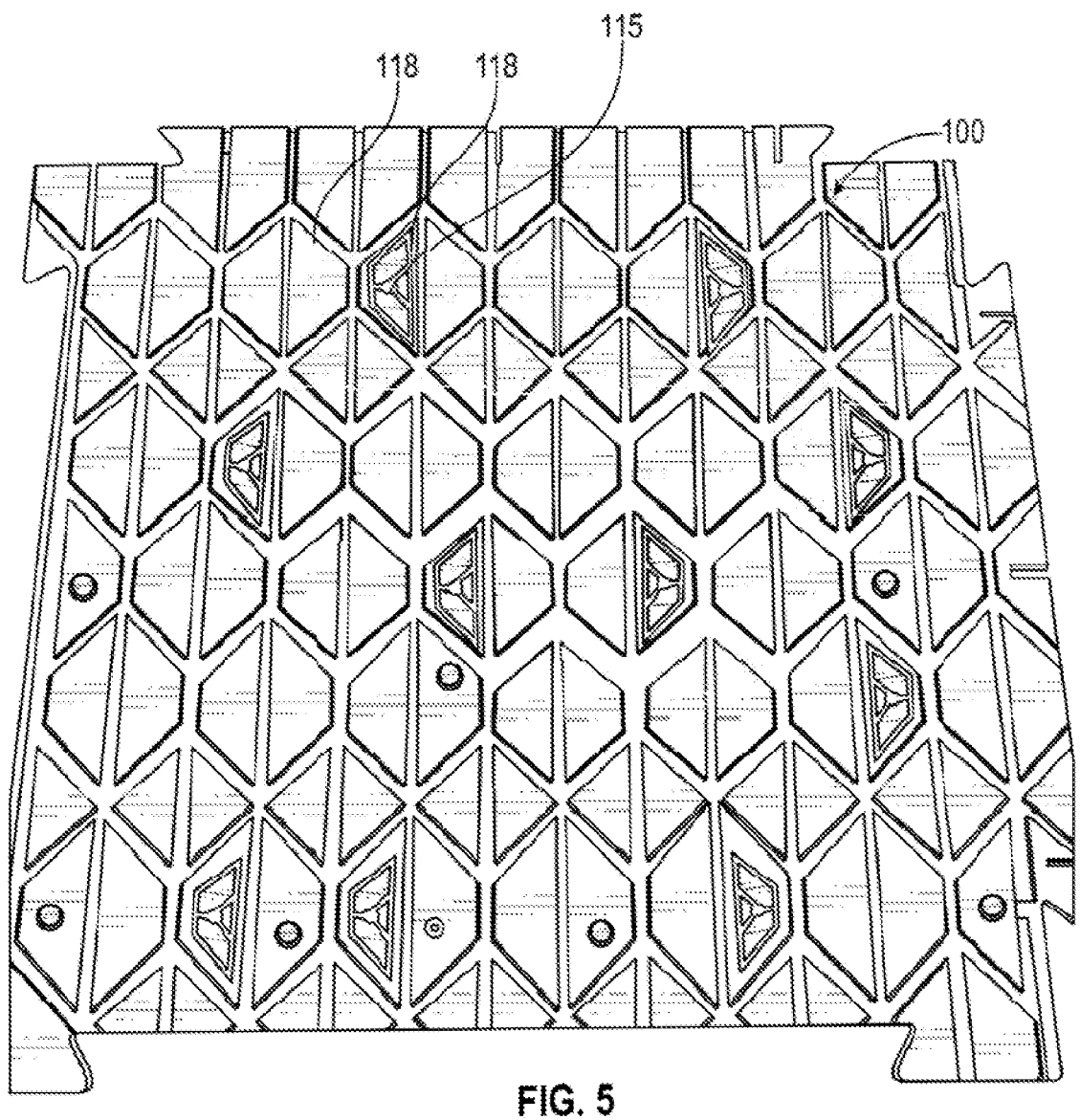
FIG. 5 is a bottom view of the pad for use in the padding layer of an athletic field according to various embodiments of the present disclosure.

Turning now to FIG. 5, a pad 100 that includes bottom-side projections 118 on a bottom side or surface of the pad 100 is shown. While the top-side projections 103 shown on a top of the pad 100 may be square-shaped, the bottom-side projections 118 on the bottom side of the pad 100 may be trapezoidal-shaped in some embodiments. Other shapes may be employed, however. With respect to one of the bottom-side projections 118 shown in the pad 100 of FIG. 5, a drainage hole 115 may be positioned on one of the bottom-side projections 118, for instance, at a center of the bottom-side projection 118 such that the drainage hole 115 does not connect with other potential water channels on a bottom of the pad 100. Instead, the drainage hole 115 may intersect a top-side projection 103 with a bottom-side projection 118 to allow water to flow from a top-side projection 103 to a bottom-side projection 118. To clarify, the drainage hole 115 may connect top-side projections 103 and bottom-side projections 118, as opposed to top-side channels and bottom-side channels.

Figure 6:
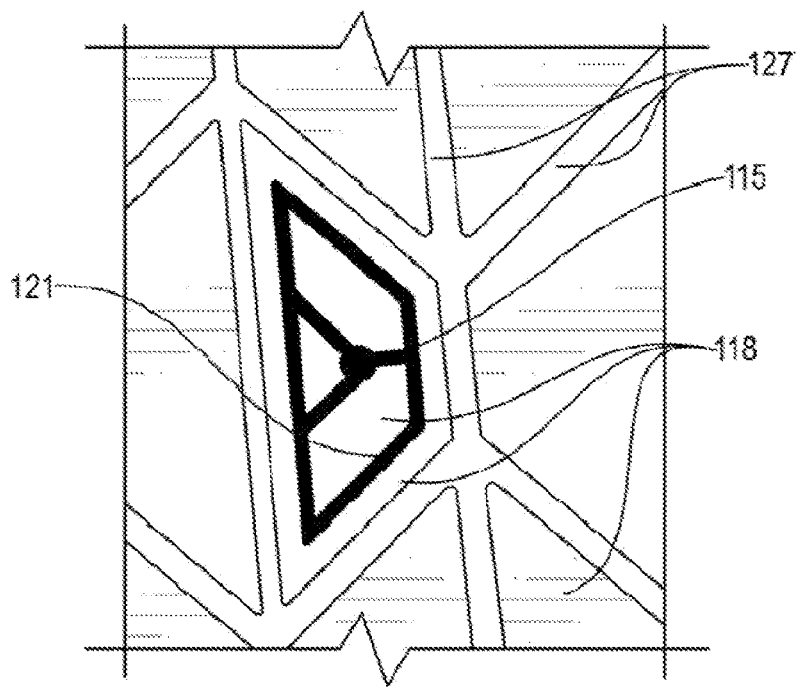
FIG. 6 is an enhanced view of a projection and channels of the pad according to various embodiments of the present disclosure.
Figure 7:
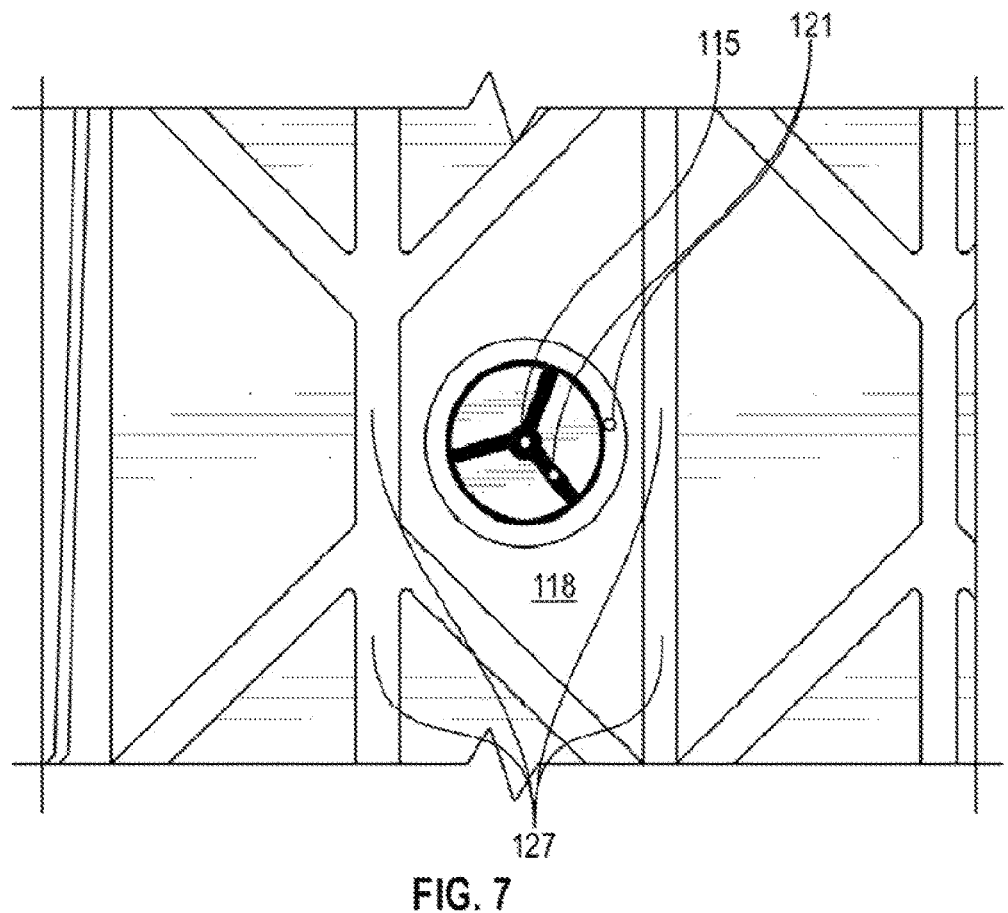
FIG. 7 is an enhanced view of a projection and channels of the pad according to various embodiments of the present disclosure.

Moving on to FIGS. 6 and 7, an enhanced view of one of the bottom-side projections 118 on the bottom side of the pad 100 is shown. The drainage hole 115 connecting the bottom-side projection 118 may be at least partially coupled to projection channels 121 on the bottom-side projection 118 acting as water vacuum to facilitate air circulation and vertical water evacuation. The projection channels 121 may be partially recessed in a surface of the bottom-side projection 118 and positioned within a perimeter of the bottom-side projection 118 such that the projection channels 121 do not couple to a channel beyond the perimeter of the bottom-side projection 118.

In various embodiments, the projection channels 121 may be formed as different shapes, such as a circle, trapezoid, or square, all while being positioned within a perimeter of a bottom-side projection 118. In some embodiments, the projection channel 121 is never connected with a bottom pad channel 127 that is formed between bottom-side projections 118, as shown in FIG. 7. In other embodiments, however, the projection channel 121 may be fluidly coupled to the bottom pad channel 127.

The recesses of the projection channels 121, as shown in FIGS. 6 and 7, may be circular or trapezoidal as illustrated. Additionally, the projection channels 121 may be described as having a perimeter which may be different and smaller than a perimeter of the bottom-side projection 118, where the recess runs along the perimeter. The projection channel 121 may also include one or more linear recesses that extend radially from the drainage hole 115 to the perimeter recess of the projection channel 121.

Figure 8:
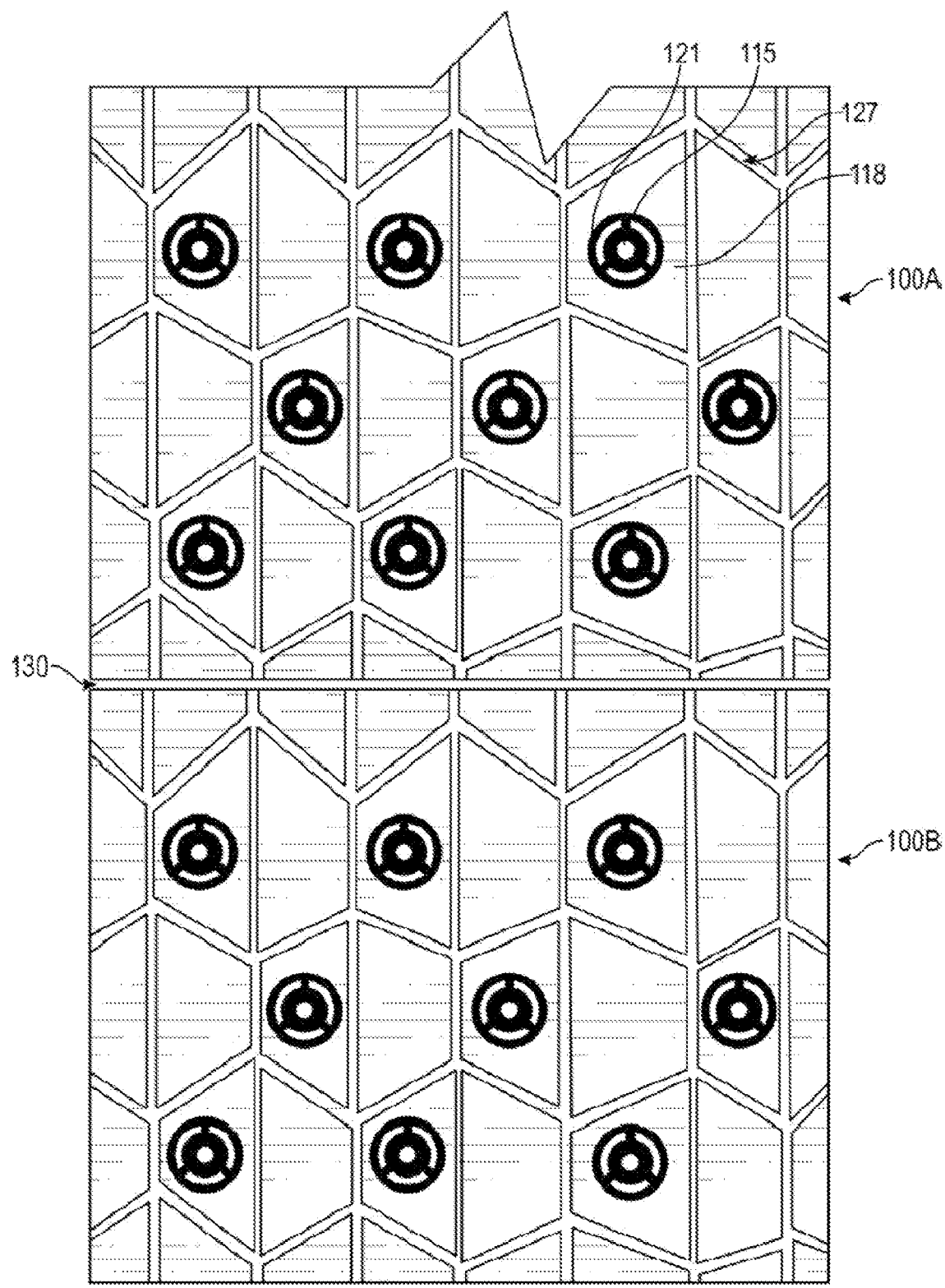
FIG. 8 is a view showing a pattern of projections and channels of the pad according to various embodiments of the present disclosure.

Turning now to FIG. 8, a bottom surface of pads 100a, 100b coupled to one another is shown according to various embodiments. In some embodiments, a pad 100 may be configured such that, when multiple pads 100a, 100b are coupled or otherwise connected, a bottom water channel 130 is formed such that a water channel of a first pad 100a is not directly coupled to a water channel of a second pad 100b. The interlocking connection between adjacent ones of the pads 100 will be more easily understood with reference to FIGS. 9A and 9B.

Figure 9A:
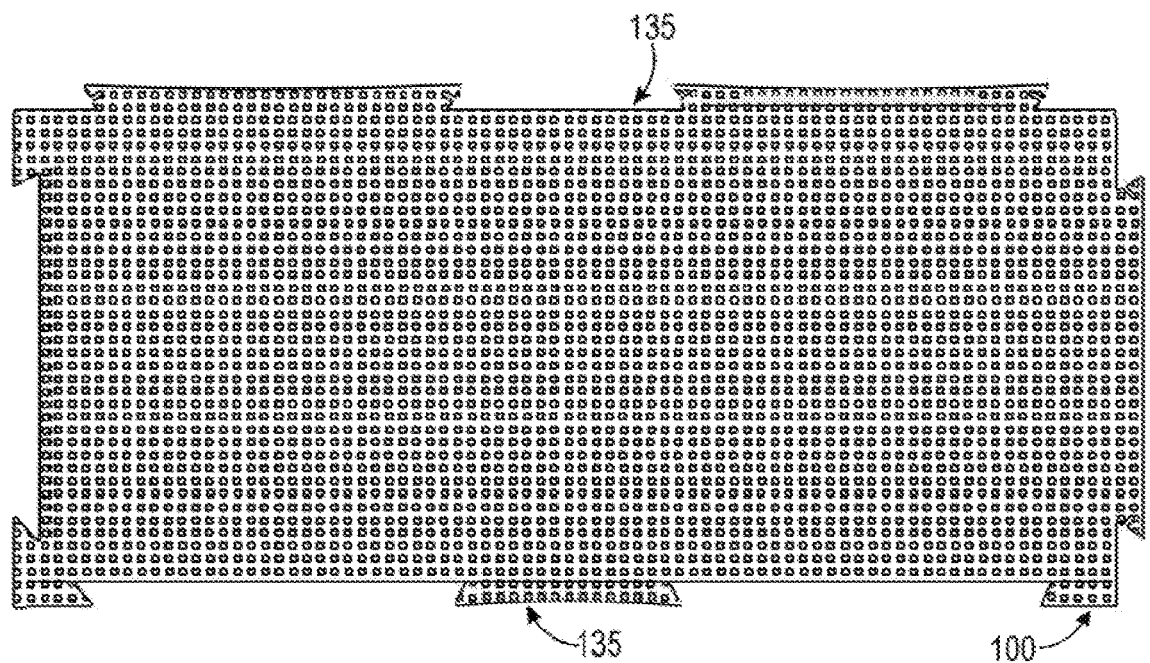
FIG. 9A is another top view of the pad according to various embodiments of the present disclosure.
Figure 9B:
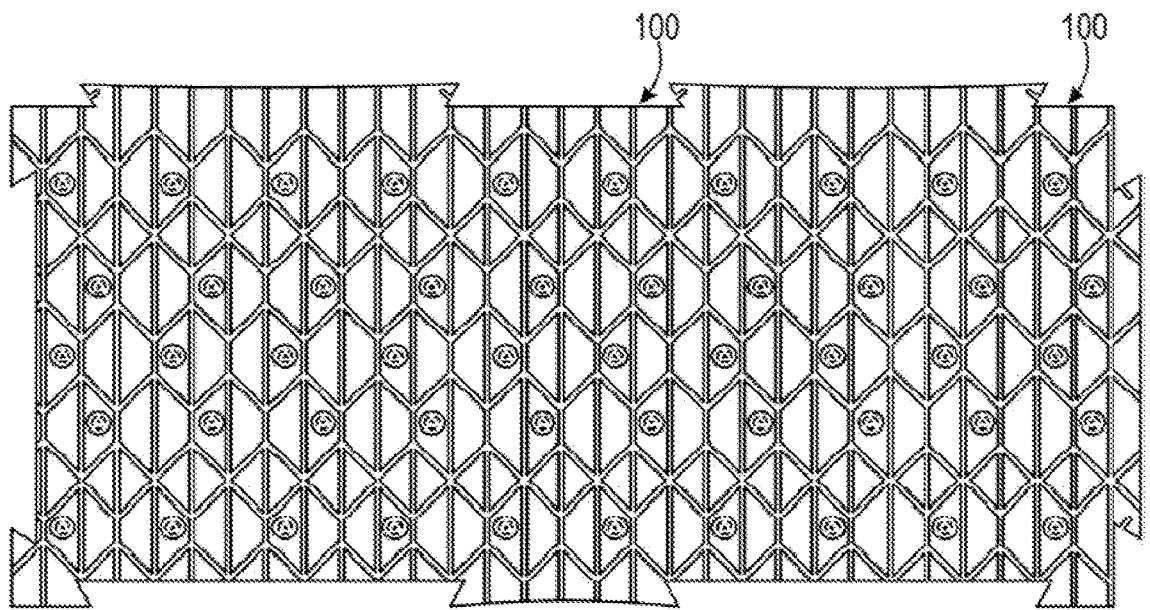
FIG. 9B is another bottom view of the pad according to various embodiments of the present disclosure.

Referring next to FIGS. 9A and 9B, a dove-tail connection may be formed between a first pad 100a and a second pad 100b using, for example, a male locking element 135 and a female locking element 140. For instance, to connect two pads 100a, 100b, the female locking element 140 of a first pad 100a may be positioned vertically above the male locking element 135 of the second pad 100b. Then, the first pad 100a may be pressed down onto the second pad 100b such that the male locking element 135 and the female locking element 140 engage one another and form an interference fit.

In some embodiments, the male locking element 135 has a size substantially similar to the female locking element 140 of the adjacent pad 100. Panel installation may be performed in a square fashion or in an offset fashion depending the position of the female locking element 140 on the pad 100. For instance, as shown in FIG. 10, if the installation is in a recess, a padding layer may require two females locking elements 140a, 140b of a first pad 100a and a second pad 100b to connect to a male locking element 135 of a third pad 100c.

Figure 11A:
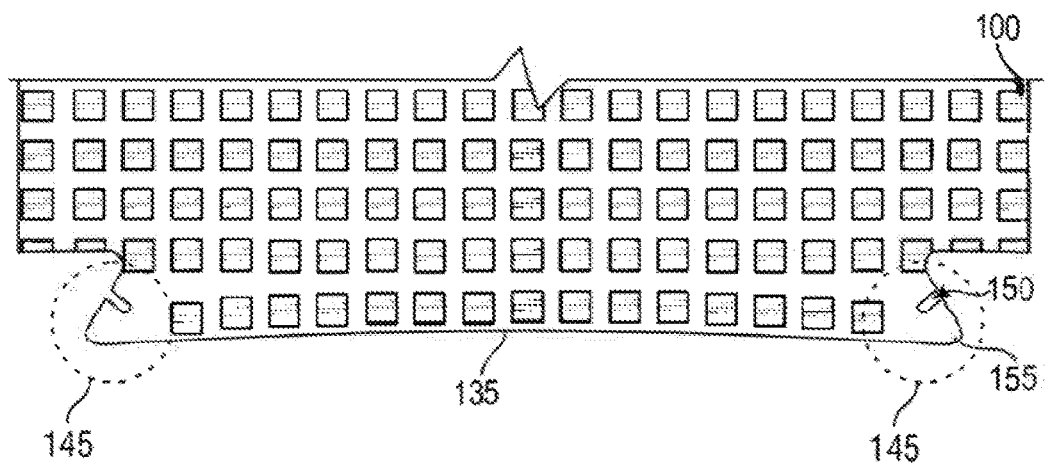
FIGS. 11A and 11B are enhanced views of contact areas of the pad according to various embodiments of the present disclosure.
Figure 11B:
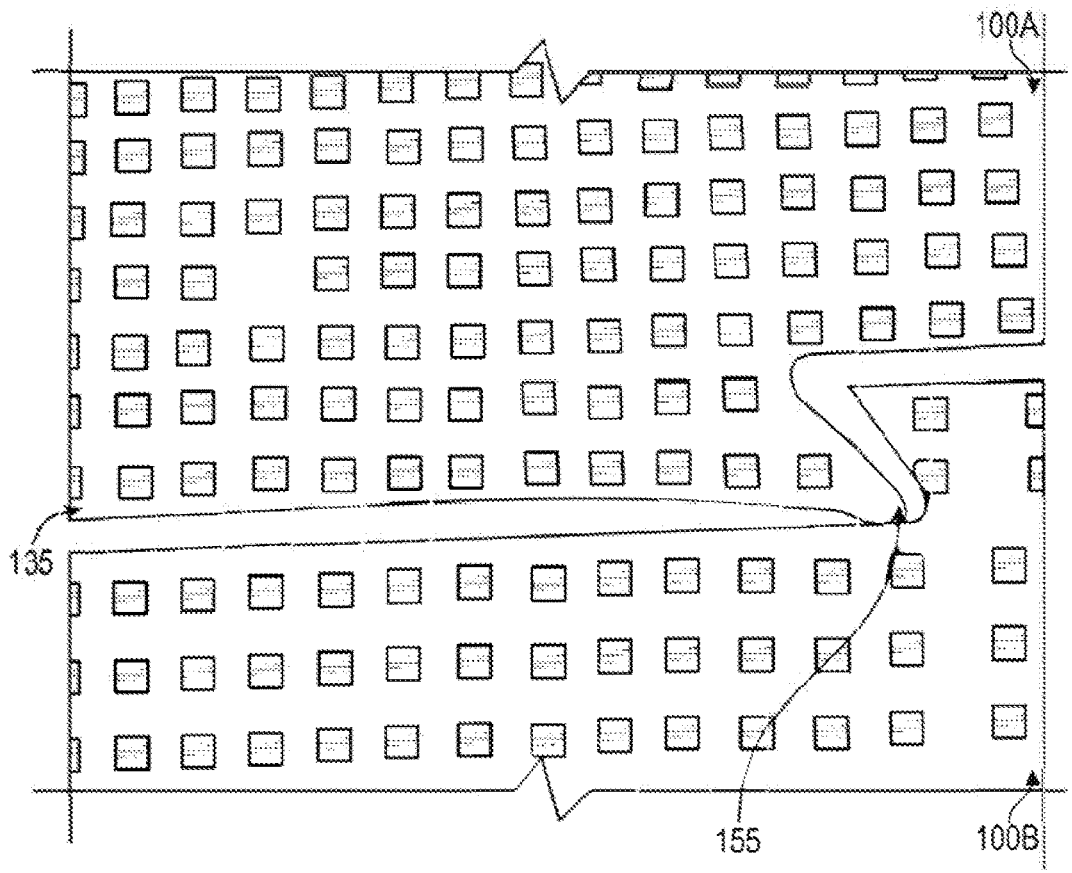

Referring next to FIGS. 11A and 11B, to allow thermal expansion and water flow between top and bottom surfaces of adjacent pads 100, the male locking element 135 of the pad 100 can be shaped in various ways to be non-linear and to create connection points with an adjacent pad 100. In some embodiments, contact areas 145 of the male locking element 135 do not have any side protrusions (or projections) to limit panel expansion. According to various embodiments, however, the male locking element 135 may be shark-tail-shaped, bump-shaped, butterfly-shaped, or other irregular shape suitable for providing a connection to an adjacent pad 100. In some embodiments, a niche 150 (or recess) may be formed in a projection 155 on each side of the male locking element 135 to allow for thermal expansion or other shifting (e.g., due to impacts on the top surface) in the padding layer.

Figure 12A:
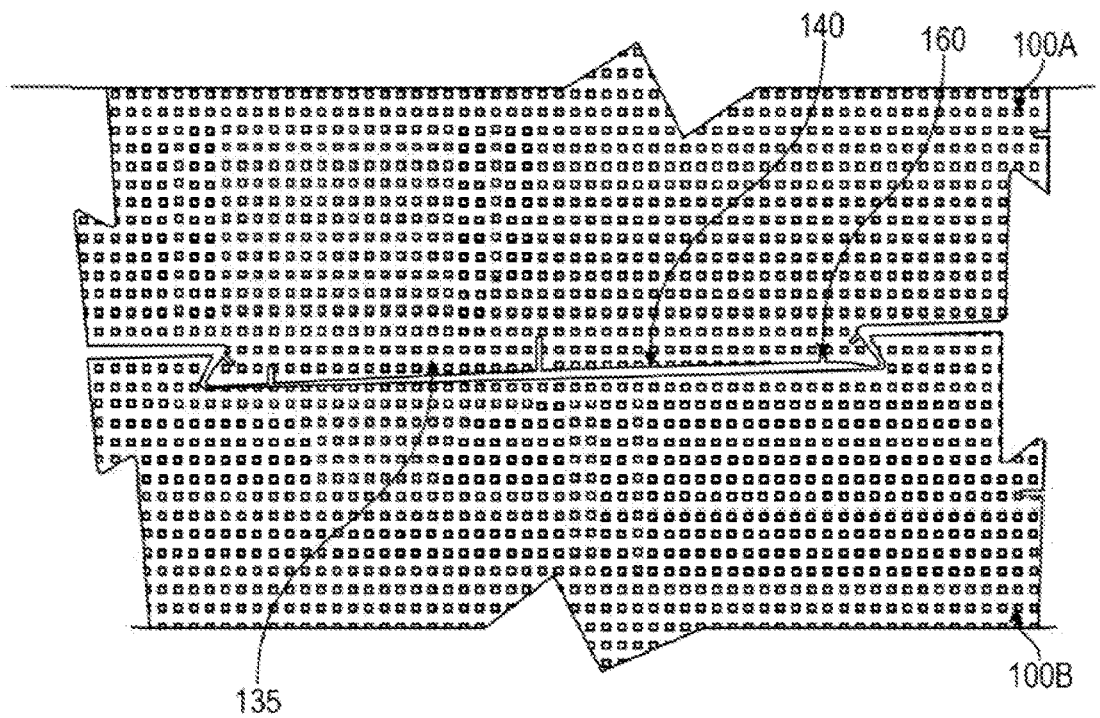
FIGS. 12A, 12B, and 12C are top views of contact areas of the pad according to various embodiments of the present disclosure.
Figure 12B:
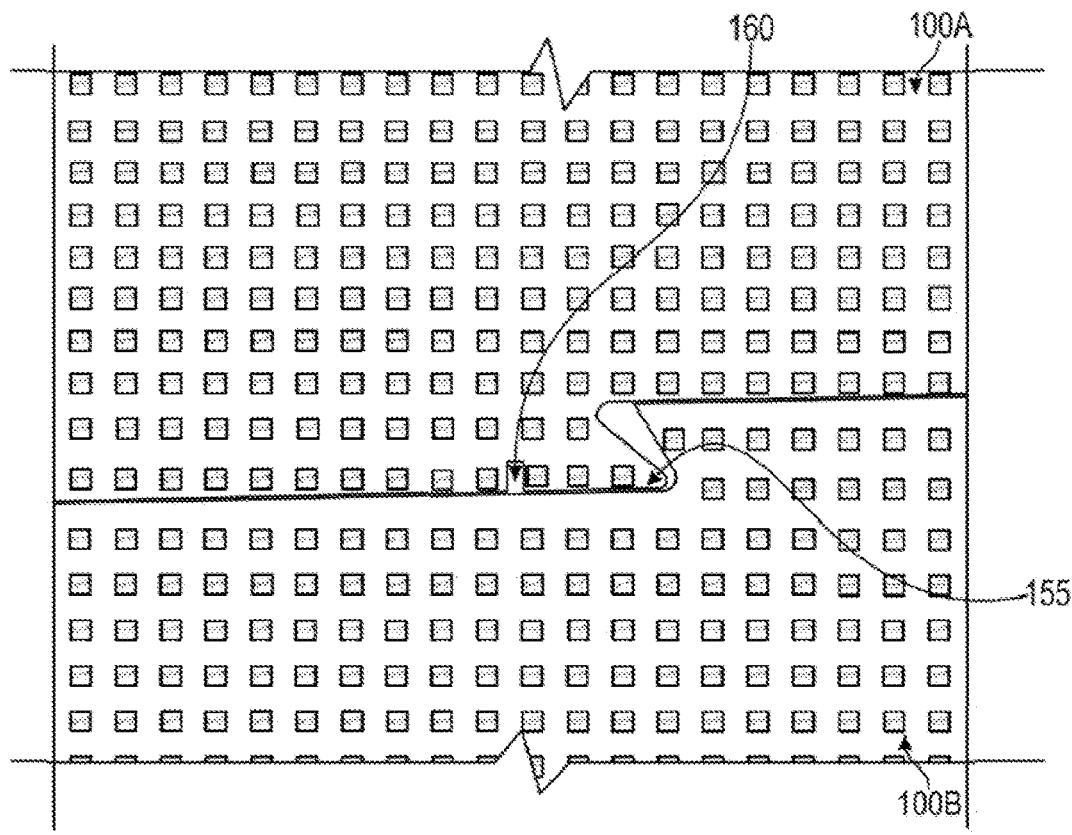
Figure 12C:
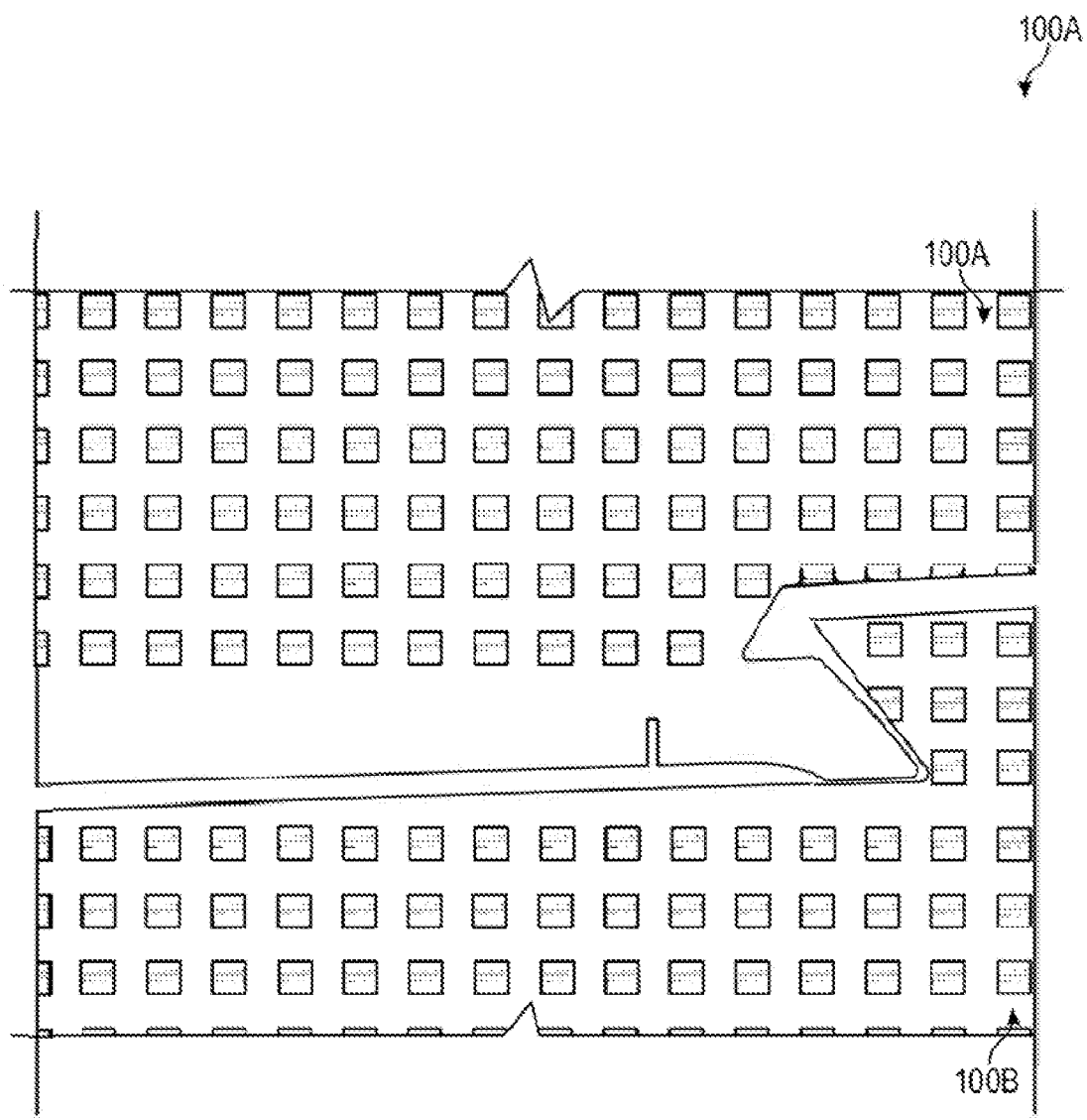

Finally, with respect to FIGS. 12A-12C, end projections 155 of the male locking element 135 may include a slot 160 that facilitates movement of the projections 155 and/or the male locking element 135, for instance, under pressure in warm and/or cold conditions. FIG. 12B, for instance, shows the slot 160 in a normal state (e.g., one of the projections 155 of the male locking element 135 not being under pressure). FIG. 12C, however, shows the slot 160 in a compressed state, for instance, when the projection 155 and/or the male locking element 135 is under tension. The slot 160 also acts as a spring that recovers a position of the projection 155 and the pad 100 after stress from temperature or other force is alleviated.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by supported claims.

Therefore, the following is claimed:

1. A panel system, comprising:
   a first pad, the first pad comprising:
   a top surface and a bottom surface;
   a plurality of top-side projections positioned on the top surface of the pad;
   a plurality of bottom-side projections positioned on the bottom surface of the pad;
   a plurality of water channels positioned on the bottom surface of the pad defined as a recessed area between individual ones of the plurality of bottom-side projections;
   a drainage hole positioned in at least one of the plurality of bottom-side projections such that the drainage hole does not connect with any of the plurality of water channels on the bottom surface of the pad,
      wherein the drainage hole intersects at least one of the plurality of top-side projections with the at least one of the plurality of bottom-side projections, thereby permitting water to flow from the at least one of the plurality of top-side projections to the at least one of the plurality of bottom-side projections;
   a female locking element having a recess; and
   a second pad substantially similar to the first pad, comprising a male locking element configured to form a dove-tail connection with the female locking element of the first pad through an interference fit when the male locking element is positioned in the recess.

2. The system according to claim 1, wherein the drainage hole is at least partially coupled to projection channels on the at least one of the plurality of bottom-side projections, the projection channels acting as a water vacuum to facilitate air circulation and vertical water evacuation relative to the drainage hole.

3. The system according to claim 2, wherein the projection channels are partially recessed in a surface of the at least one of the plurality of bottom-side projections and positioned within a perimeter of the at least one of the plurality of bottom-side projections such that the projection channels do not couple to a channel beyond the perimeter of the at least one of the plurality of bottom-side projections.

4. The system according to claim 3, wherein:
   the projection channels have a perimeter that is smaller than the perimeter of the at least one of the bottom-side projections;
   the drainage hole is positioned within one of the projection channels; and other ones of the projection channels extend radially from the drainage hole to the one of the projection channels while being positioned within a perimeter of the at least one of the plurality of bottom-side projections.

5. The system according to claim 4, wherein a recess of the one of the projection channels runs along the perimeter of the at least one of the plurality of bottom-side projections.

6. The system according to claim 5, wherein the one of the projection channels is an outermost one of the projection channels and is circular-shaped, trapezoidal-shaped, or square-shaped.

7. The system according to claim 1, wherein at least a portion of the plurality of bottom-side projections are trapezoidal-shaped.

8. The system according to claim 1, wherein individual ones of the plurality of top-side projections have a height varied from other ones of the top-side projections, the height determined as a function of a distance of a respective one of the plurality of top-side projections from an edge of the panel.

9. The system according to claim 1, wherein the pad is formed of at least one of: nanocellulose, expanded polypropylene (EPP), hybrid expanded polypropylene EPP (HEPP), a mix of an expanded polypropylene (EPP) with an expanded polyethylene (EPE) or polyethylene (PE), and a rubber material.

10. The system according to claim 9, wherein the nanocellulose comprises a plurality of nanocellulose beads.

11. A method, comprising:
providing a pad for use in a padding layer of a panel system, the pad comprising:
a top surface and a bottom surface;
a plurality of top-side projections positioned on the top surface of the pad;
a plurality of bottom-side projections positioned on the bottom surface of the pad;
a plurality of water channels positioned on the bottom surface of the pad defined as a recessed area between individual ones of the plurality of bottom-side projections;
a drainage hole positioned in at least one of the plurality of bottom-side projections such that the drainage hole does not connect with any of the plurality of water channels on the bottom surface of the pad,
wherein the drainage hole intersects at least one of the plurality of top-side projections with the at least one of the plurality of bottom-side projections, thereby permitting water to flow from the at least one of the plurality of top-side projections to the at least one of the plurality of bottom-side projections,
wherein the drainage hole is at least partially coupled to projection channels on the at least one of the plurality of bottom-side projections, the projection channels acting as a water vacuum to facilitate air circulation and vertical water evacuation relative to the drainage hole; and
a female locking element having a recess; and
a second pad substantially similar to the first pad, comprising a male locking element configured to form a dove-tail connection with the female locking element of the first pad through an interference fit when the male locking element is positioned in the recess.

12. The method according to claim 11, wherein the projection channels are partially recessed in a surface of the at least one of the plurality of bottom-side projections and positioned within a perimeter of the at least one of the plurality of bottom-side projections such that the projection channels do not couple to a channel beyond the perimeter of the at least one of the plurality of bottom-side projections.

13. The method according to claim 12, wherein:
the projection channels have a perimeter that is smaller than the perimeter of the at least one of the bottom-side projections;
the drainage hole is positioned within one of the projection channels; and
other ones of the projection channels extend radially from the drainage hole to the one of the projection channels while being positioned within a perimeter of the at least one of the plurality of bottom-side projections.

14. The method according to claim 13, wherein a recess of the one of the projection channels runs along the perimeter of the at least one of the plurality of bottom-side projections.

15. The method according to claim 14, wherein the one of the projection channels is an outermost one of the projection channels and is circular-shaped, trapezoidal-shaped, or square-shaped.

16. The method according to claim 11, wherein at least a portion of the plurality of bottom-side projections are trapezoidal-shaped.

17. The method according to claim 11, wherein individual ones of the plurality of top-side projections have a height varied from other ones of the top-side projections, the height determined as a function of a distance of a respective one of the plurality of top-side projections from an edge of the panel.

18. The method according to claim 11, wherein the pad is formed of at least one of: nanocellulose, expanded polypropylene (EPP), hybrid expanded polypropylene EPP (HEPP), a mix of an expanded polypropylene (EPP) with an expanded polyethylene (EPE) or polyethylene (PE), and a rubber material.

19. The method according to claim 18, wherein the nanocellulose comprises a plurality of nanocellulose beads.

* * * * *